(12) United States Patent
Steingrandt et al.

(10) Patent No.: US 8,870,032 B2
(45) Date of Patent: Oct. 28, 2014

(54) DRY GRANULAR MATERIAL DISPENSER

(76) Inventors: William James Steingrandt, Hendersonville, NC (US); John Brantley Dill, Hendersonville, NC (US)

( * ) Notice: Subject to any disclaimer, the term of this patent is extended or adjusted under 35 U.S.C. 154(b) by 153 days.

(21) Appl. No.: 13/344,672

(22) Filed: Jan. 6, 2012

(65) Prior Publication Data

US 2012/0205398 A1    Aug. 16, 2012

Related U.S. Application Data

(60) Provisional application No. 61/442,870, filed on Feb. 15, 2011.

(51) Int. Cl.
     *B67D 7/84*      (2010.01)
     *B67D 7/58*      (2010.01)
     *B67D 7/78*      (2010.01)
     *A01C 15/02*      (2006.01)

(52) U.S. Cl.
     CPC ........................................ *A01C 15/02* (2013.01)
     USPC ......... 222/175; 222/464.5; 222/492; 222/380

(58) Field of Classification Search
     CPC ............ A01C 15/02; A01C 7/02; B67D 7/58; B67D 7/84
     USPC .................. 222/175, 464.5, 492, 378–380, 222/522–525; 111/92, 95–99
     See application file for complete search history.

(56) References Cited

U.S. PATENT DOCUMENTS

| | | | | |
|---|---|---|---|---|
| 216,423 A | * | 6/1879 | Lewis | 222/175 |
| 952,252 A | * | 3/1910 | Ingram | 222/175 |
| 1,844,260 A | * | 2/1932 | Nicolino | 222/440 |
| 1,911,692 A | * | 5/1933 | Jalandoni | 111/95 |
| 2,239,464 A | * | 4/1941 | Moger | 222/505 |
| 2,287,216 A | * | 6/1942 | Williams | 222/227 |
| 2,370,744 A | * | 3/1945 | Molinare | 111/96 |
| 2,772,815 A | * | 12/1956 | Bye | 222/175 |
| 3,181,576 A | * | 5/1965 | Pellerino et al. | 141/293 |
| 4,206,714 A | * | 6/1980 | Walsh | 111/92 |
| 4,290,374 A | * | 9/1981 | Maples | 111/92 |
| 4,387,852 A | | 6/1983 | Mattson et al. | |
| 4,760,807 A | * | 8/1988 | Keller | 111/92 |
| 4,934,288 A | * | 6/1990 | Kusiak et al. | 111/92 |
| 5,101,744 A | * | 4/1992 | Nolan | 111/95 |
| 5,131,570 A | * | 7/1992 | Sawyer, III | 222/175 |
| 5,339,994 A | * | 8/1994 | Nuila | 222/175 |
| 5,431,115 A | | 7/1995 | Auer | |
| 5,497,713 A | * | 3/1996 | Anderson et al. | 111/92 |
| 6,981,457 B2 | | 1/2006 | Stolz | |
| 7,641,082 B2 | | 1/2010 | Seton | |

\* cited by examiner

*Primary Examiner* — Paul R Durand
*Assistant Examiner* — Vishal Pancholi
(74) *Attorney, Agent, or Firm* — Bennett Mullinax, LLC

(57) ABSTRACT

A hand-held dispenser for dry granular materials consists of a reservoir for the material, a removable telescoping rigid tube assembly, and a flexible valve assembly at the bottom of the tube assembly which allows passage of material when the inner tube is pushed into the outer tube. The reservoir includes a handle which allows the apparatus to be hand-held with the valve assembly end pointed downward. The inner tube is rigidly attached to the removable reservoir and can be pumped up and down to a pair of stops to dispense a measured amount of material at the bottom end of the telescoping tubes. The flexible valve can be constructed of a rubber sheet with radial fingers or spring loaded closure which will flex open to dispense material when the inner tube is pushed downward, but will not allow material to flow by gravity alone.

9 Claims, 6 Drawing Sheets

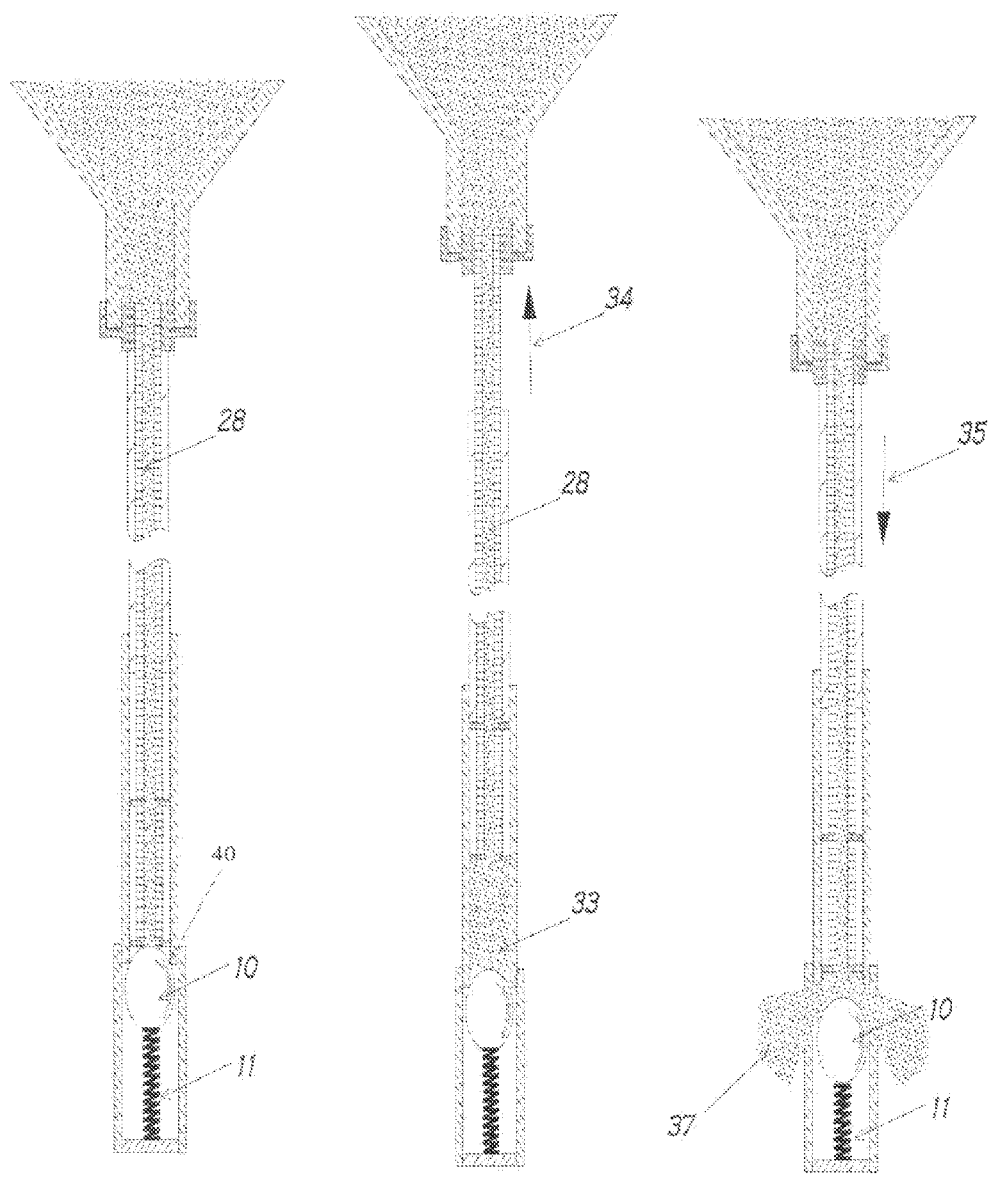

DRY GRANULAR MATERIAL DISPENSER

CROSS-REFERENCE TO RELATED APPLICATIONS

This application claims priority to U.S. Provisional Patent Application Ser. No. 61/442,870, filed on Feb. 15, 2011, entitled "Dispenser For Dry Granular Materials," the contents of which are incorporated by reference herein.

STATEMENT REGARDING FEDERALLY SPONSORED RESEARCH OR DEVELOPMENT

Not applicable.

FIELD OF INVENTION

The present invention relates to a hand-held dry material dispenser capable of applying a measured amount of fertilizer, herbicide, or other like material to potted or in-ground plants in a productive and low-cost manner. Previous mechanisms for such application have been prone to clogging, complicated, or operated in such a manner as to damage the dispensed material.

BACKGROUND OF THE INVENTION

Many nurseries have thousands of potted plants in their inventory. In order to maintain a correct level of nutrients for the plants nurseries will apply time release dry fertilizers to the soil surface. In the past methods for such application included manual application using a cup or spoon, broadcasting which wastes expensive fertilizer, or use of a variety of mechanical applicators which are complex and may damage the fertilizer time release coating by physical value closure.

Large well established nurseries may be able to afford the more expensive mechanical applicators, however many smaller or more specialized growing operations may be unable to afford the expensive mechanical applicators and their maintenance costs.

Existing applicators are prone to jamming, clogging, or are difficult to use productively. Or conversely, they have multiple parts, require a blower or other power source and thus are expensive to manufacture. A large number of existing patents disclose a variety of dispensing methods. Each method requires manually or electronically operated valve or else does not control the amount of material dispensed.

A first example is U.S. Pat. No. 6,981,457 B2 which consists of an implement mounted cylinder with baffles at the lower end. As the implement (such as a rake) is moved, material moves through the baffles and is dispensed to the ground. While simple, this device has no method for exactly controlling the amount of material applied.

The next example is U.S. Pat. No. 2,772,815 which teaches a rotating paddle wheel for metering controlled amounts of material for application. This method is subject to clogging and jamming and also may damage fragile coatings on time-release fertilizers.

U.S. Pat. No. 5,339,994 shows a dual valve system for metering fixed amounts for application. Again this approach may harm coatings and is subject to jamming from material build-up.

U.S. Pat. No. 7,641,082 B2 has an electronically operated valve for dispensing a controlled amount of material. The use of a microprocessor and other electronics for control makes the manufacture of this device relatively expensive. Also a mechanically operated valve can still damage coatings.

Other patents reviewed include U.S. Pat. No. 4,387,852, U.S. Pat. No. 5,101,744, U.S. Pat. No. 5,431,115, and U.S. Pat. No. 4,934,288.

As seen above, there are a variety of dry material applicators that have been disclosed. Each device may be prone to clogging or jamming, may not accurately meter the correct amount of material, may damage material by mechanically closing a valve, or may be costly to manufacture. An ideal dispensing apparatus would be simple with few moving parts, gentle on the dispensed material, resist clogging and jamming, and be easy to use for long periods.

SUMMARY OF THE INVENTION

This invention provides a mechanism for the application of a measured amount of fertilizer or other dry granular material to a localized area such as a potted plant surface or to in-ground plants requiring a direct application of material. The mechanism is simple, consisting of less than three moving parts, is comfortable to use for extended periods, does not subject the dispensed material to a forced valve closing mechanism, and resists clogging or jamming. Two embodiments are disclosed: the first using a rubber or other compliant valve material, and a second using a spring loaded ball valve assembly.

The mechanism comprises a material reservoir with a handle mounted to a rigid tube which slides within a second rigid outer tube. Movement stops are provided so that the inner tube movement is precisely controlled. The end of the outer tube is fitted with a flexible compliant valve which allows material to flow only when the inner tube is pushed downward within the outer tube. An operator holds the apparatus by the reservoir handle with one hand, while holding the outer tube with the other hand. As the apparatus is held pointing downward and pumped an exact amount of material is dispensed through the valve at the bottom.

In a typical embodiment the length of travel of the inner tube is less than two inches to dispense a tablespoon of material over several square inches. This short travel makes repeated use of the device over long periods easy. After each pump the device is ready for the next cycle which makes it productive allowing thousands of applications per hour. The large muscles of the arms are less prone to fatigue than the fingers allowing longer periods of use.

An optional clip is provided to restrict movement of the inner tube so that a lower amount of material is dispensed with each stroke. This clip is pushed onto the inner tube at the top near the material reservoir which then restricts the inner wand from traveling the full length of its normal stroke.

The second embodiment of the dispenser that includes the spring loaded ball valve will dispense the material in a broader pattern which is useful for herbicide application.

BRIEF DESCRIPTION OF THE DRAWINGS

FIG. 9 shows a cross-section of the second embodiment of the device with the inner tube fully in the down position.

FIG. 10 is a cross-section of the second embodiment after the upward stroke showing material ready for the downward stroke.

FIG. 11 shows material being dispensed on the downward stroke of the second embodiment.

DETAILED DESCRIPTION OF THE INVENTION

The present invention will now be described in more detail with reference to the accompanying drawings. Two preferred embodiments are described. However, additional embodiments are possible and the two described should not be construed as the only practicable embodiments. Like numbers refer to like elements throughout the drawings and text.

Figure 1:
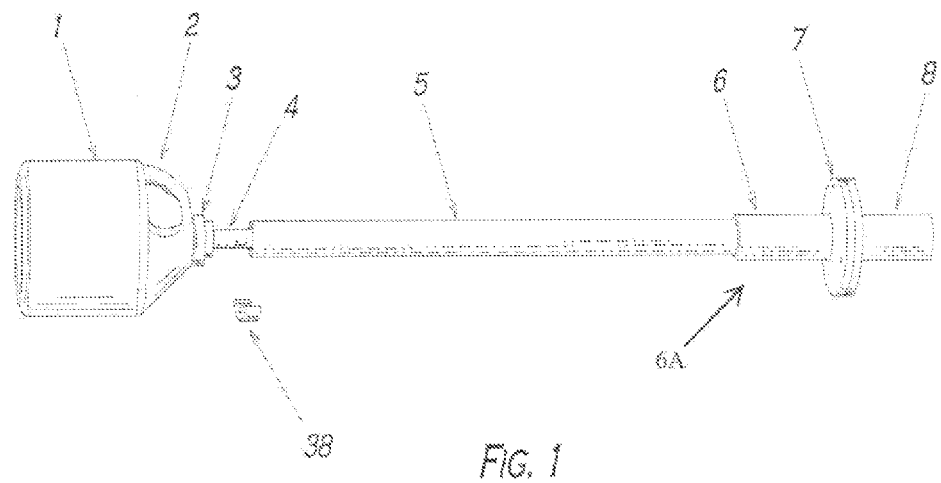
FIG. 1 is a direct view of the assembled first embodiment of the dispenser including the optional restriction clip.

FIG. 1 illustrates the salient components of the preferred embodiment of the material dispenser. As shown, the dispenser comprises a material reservoir 1 with a handle 2, a screw cap assembly 3 allowing removal of the reservoir for filling, an inner wand or tube 4, a rigid pipe, which is free to move a predetermined distance within an outer wand or tube 5, also a rigid pipe of diameter larger that the inner wand 4, a piston-cylinder assembly 6A that can include a cylinder 6 a flexible compliant valve assembly 7, and a spout 8 for delivery of the material to the desired spot.

Figure 2:
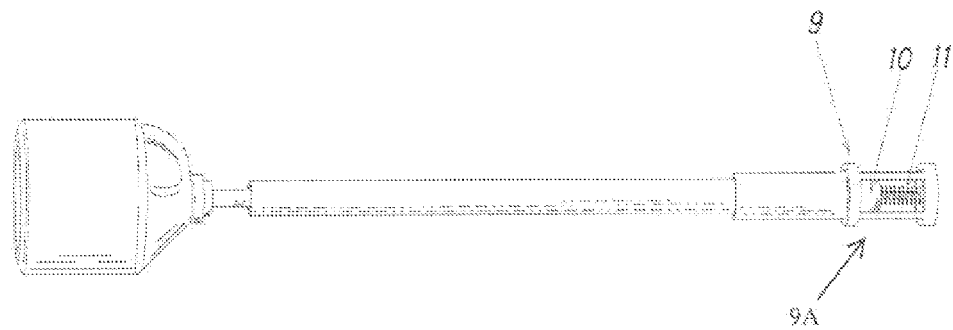
FIG. 2 is a direct view of the assembled second embodiment of the dispenser.

FIG. 2 shows a second embodiment of the dispenser where the compliant valve 7 and the spout 8 have been replaced with a ball valve and spring assembly 9A. The remainder of the dispenser is unchanged from FIG. 1.

Figure 3:
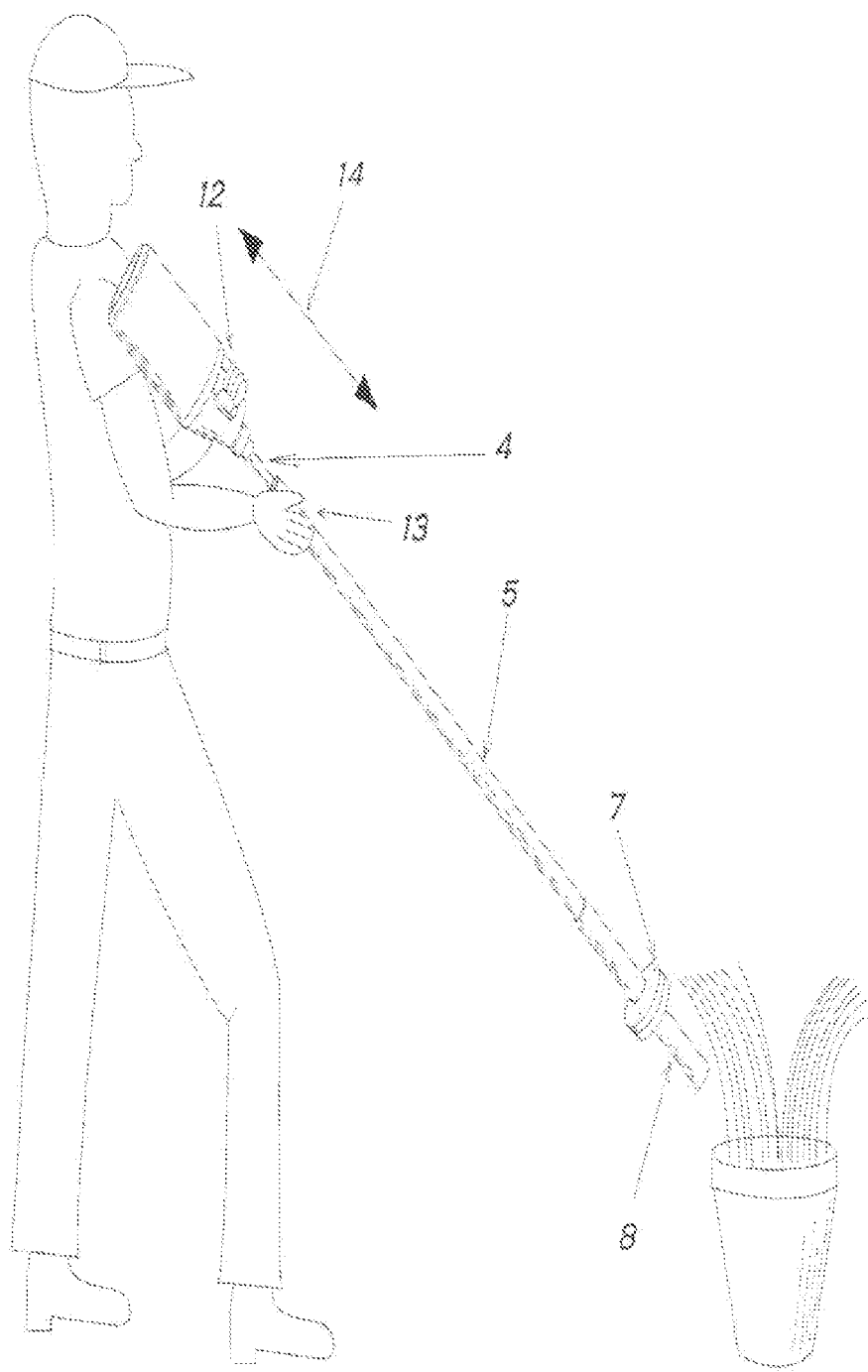
FIG. 3 shows the dispenser device in use fertilizing potted plants.

Operation of the dispenser is shown in FIG. 3. The operator holds the reservoir handle in one hand 12 while the other hand 13 holds the outer wand 5. To dispense a measured amount of material the device is held at a 45 degree angle or greater as shown in FIG. 3 while moving the inner wand 4 upward then downward 14. The dispenser apparatus has stops which restrict movement of the inner wand 4 to a fixed distance. This distance determines the amount of material dispensed with each complete upward and downward movement of the reservoir handle 12. The downward movement causes material to be pushed through the compliant valve 7 and to exit into the plant through the spout 8.

Figure 4:
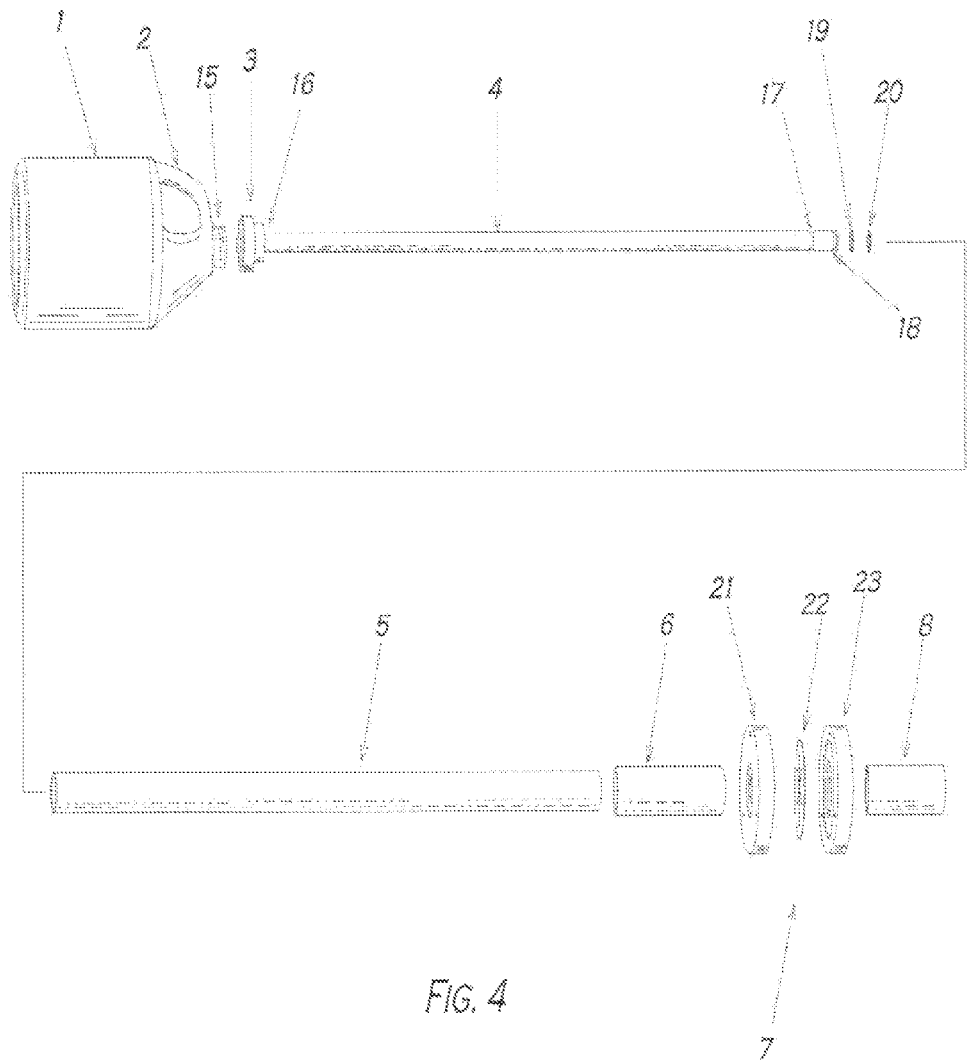
FIG. 4 shows the first embodiment device broken down into its component parts.

FIG. 4 shows all the component parts of the preferred embodiment. A reservoir 1 with a handle 2 and a screw cap or other attachment method 15 is provided. This allows removal of the reservoir 1 for filling. The inner wand 4 is rigidly attached 16 to the screw cap assembly 3. The inner wand 4 has a groove 18 which accepts a piston ring 20. The piston ring is of the correct size to fit the inside diameter of the cylinder 6. This fit allows easy movement of the inner wand 4 and the piston ring 20 within the cylinder 6. The inner wand 4 also contains a groove 17 which accepts a stop ring 19. The stop ring 19 when in place in the groove 17 can move freely within the cylinder 6. This stop ring 19 will contact the outer wand 5 to stop movement of the inner wand 4 on the upward dispensing stroke. The outer wand 5 is rigidly connected to the cylinder 6. The valve assembly 7 consists of a compliant valve 22 held in place by two flanges 21 and 23. The entire valve assembly 7 is rigidly connected to the cylinder 6 and the spout 8. The compliant valve 22 is a single piece of rubber sheet or similar material with radial slits which allow material to flow through it under small pressures. The slits form triangular fingers which easily flex to allow the valve to open allowing passage of material.

Figure 5:
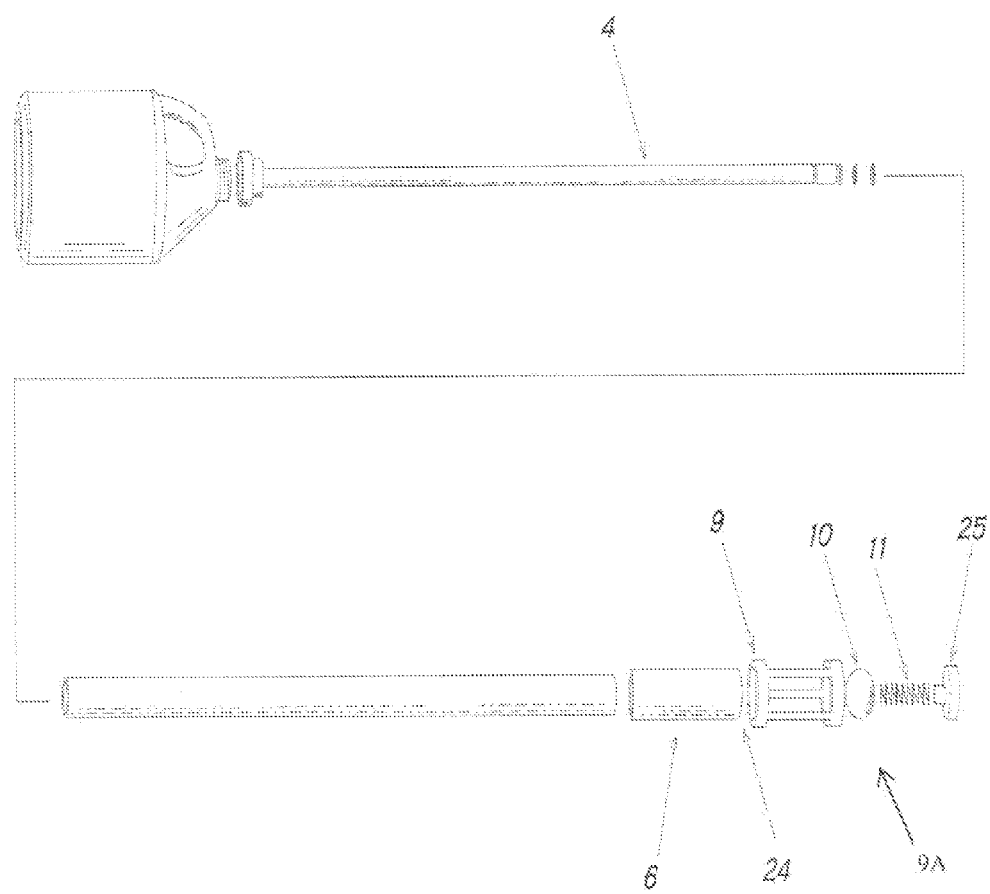
FIG. 5 shows the second embodiment of the device broken down into its component parts.

FIG. 5 shows a second embodiment of the dispenser with ball and spring valve assembly 9A replacing the compliant valve 7 of FIG. 4. A ball 10 fits freely inside an open spring support 9. The ball 10 is too large to fit within the cylinder 6 so that it forms a closure. A spring 11 supported by end piece 25 provides sufficient force to keep the ball 10 seated against the cylinder 6 until downward movement of the inner wand 4 occurs.

Figure 6:
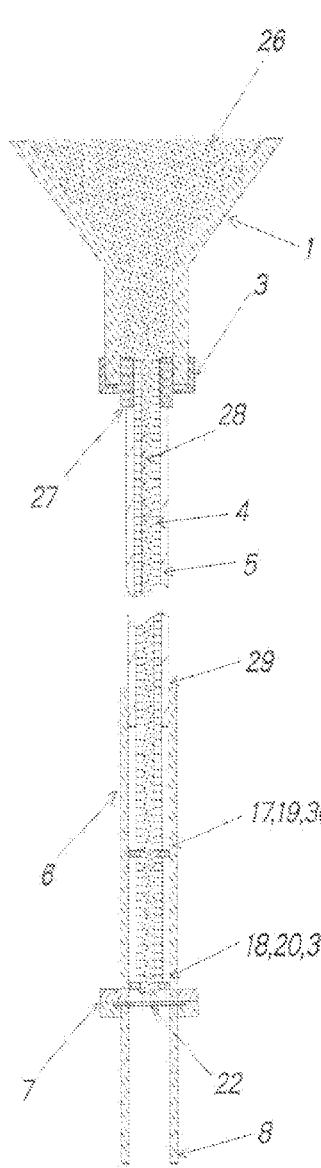
FIG. 6 is a cross-section of the device with the inner tube fully in the down position.

The dispensing operation of the preferred embodiment referenced above will now be described in detail referring to FIGS. 6-8. FIG. 6 shows a cut away diagram of the dispenser with the inner wand 4 completely in the down position. Material 26 is shown in the reservoir 1 and has flowed down the interior of the inner wand 4 generally at 28. The cap assembly 3 has contacted at 27 the outer wand 5 in the down position. This contacting at 27 caused by the abutting of the cap assembly 3 and the outer wand 5 acts as a stop on the downward stroke to stop movement so that the piston ring 20 seated at 31 at the end of the inner wand 4 stops short of the compliant valve 22. Material generally at 28 will not flow through the compliant valve 22 since friction in the inner wand 4 keeps the weight of material from exerting sufficient pressure to open the compliant valve 22. Also shown is the stop ring 19 seated at 30 in the groove 17, and the piston ring 20 seated at 31 in the groove 18. Optionally, a clip 38 as shown in FIG. 1 for the inner wand 4 can also be included that can be attached to the inner wand 4 to further restrict movement of the inner wand 4 so that a lower amount of material is dispensed with each stroke. This clip 38 is pushed onto the inner wand 4 at the top near the material reservoir 1 which then restricts the inner wand 4 from traveling the full length of its normal stroke.

Figure 7:
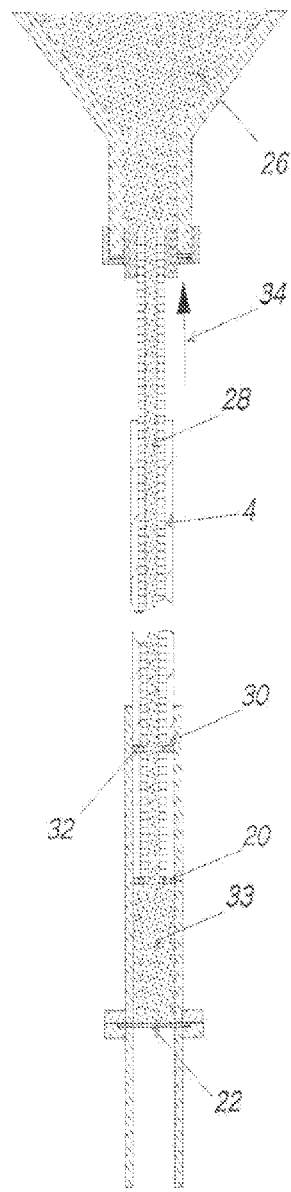
FIG. 7 is a cross-section of the device after the upward stroke showing material ready for the downward stroke.

FIG. 7 shows the dispenser after the upward stroke 34 Material generally at 28 has flowed down the inner wand 4 to fill the space 33 between the piston ring 20 and the valve 22. Because of the characteristics of dry granular material at 28 and friction within the inner wand 4 the material will not flow through the valve 22.

Figure 8:
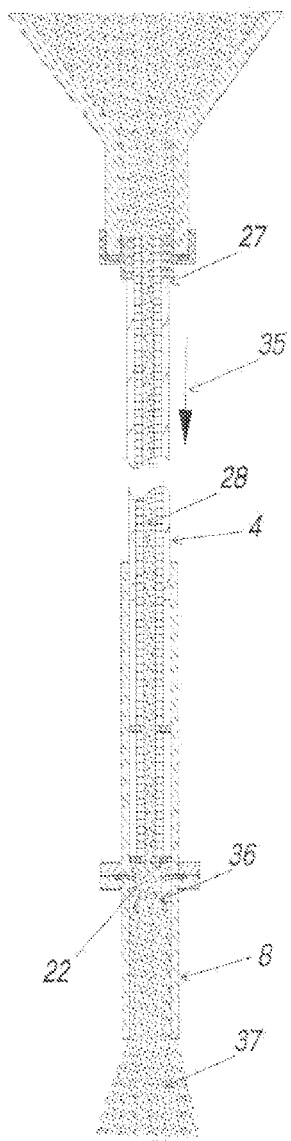
FIG. 8 is a cross-section showing material being dispensed on the downward stroke.

Referring to FIG. 8 the downward stroke 35 will cause material generally at 28 to be dispensed as shown by reference numeral 37 through the compliant valve 22 with fingers 36 opened and the spout 8. Note that the triangular fingers 36 of the valve 22 have flexed open to allow the material to flow through because of the increased pressure exerted on the material within the cylinder during the downward stroke of the inner wand 4. Material generally at 28 will not be forced back up the inner wand 4 due to friction.

FIG. 9-11 shows the same sequence of operations described above for embodiment two. In FIG. 9 the ball 10 forms a seal 40 with the outer wand preventing material from flowing out of the apparatus. The ball 10 is held upward to form the seal 40 by a spring 11.

FIG. 10 shows the upward stroke 34 of the inner wand. Material generally at 28 within the inner wand 4 flows down the inner wand 4 to fill the space 33. In FIG. 11 during the down stroke 35 the material forces the ball 10 downward compressing the spring 11 and allowing the material to flow outward as shown by reference numeral 37. This embodiment will generate a wider pattern of the material for broader dispersal on the ground.

A dispensing device for dispensing dry granular material can comprise two downward sloping rigid telescoping tubes so that the inner tube is free to slide within the outer tube. The dispensing device can also comprise a removable material reservoir connected to the inner tube allowing free flow of material downward into the inner tube and a set of stops restricting the movement of the inner tube to a predetermined length. Additionally, the dispensing device can comprise a compliant or spring loaded valve located at the bottom end of the outer tube prohibiting flow of material out of the two tubes under gravity alone. This valve will open due to increased material pressure when the inner tube is pushed downward. Further, the dispensing device can comprise a piston ring at the downward end of the inner tube to prevent material from lodging between the inner and outer tubes. Optionally, a clip for the inner tube can also be included that can be attached to the device to further restrict movement of the inner tube. The dispensing device can be pumped between stops to dispense a controlled amount of dry granular material. Material will not be pushed back up the inner tube due to friction and the properties of dry granular material. The compliant flexible valve will not damage fragile material such as coated time release fertilizer. The dispensing device can accept an optional clip further restricting movement to allow dispensing a smaller controlled amount of material. The dispensing device can have a removable reservoir with a handle allowing operation while being hand-held.

That which is claimed is:

1. A dispensing device for dispensing dry granular material, the dispensing device comprising:
   an inner tube;
   an outer tube, the inner tube slidably positioned within at least a portion of the outer tube so that the inner tube is slidable within the outer tube;
   a removable material reservoir connectable to the inner tube configured to allow a flow of material downward into the inner tube;
   a cylinder rigidly connected to the outer tube and configured such that an end of the inner tube distal from the removable material reservoir is movable within the cylinder as the inner tube is slid within the outer tube;
   a valve located at a bottom end of the cylinder that prohibits flow of material out of the cylinder under gravity alone;
   at least one stop configured to restrict sliding movement of the inner tube within the outer tube so that the end of the inner tube distal from the removable material reservoir moves a predetermined length within the cylinder;
   a piston ring secured to the inner tube, the piston ring being proximate to the end of the inner tube distal from the removable material reservoir, the piston ring configured to fit an inside diameter of the cylinder such that, as the end of the inner tube is slid upward within the cylinder, material from the removable material reservoir in the inner tube flows into the cylinder and, as the end of the inner tube is slid downward, the piston ring pushes against the material within the cylinder to create a pressure to open the valve.

2. The dispensing device according to claim 1 wherein the inner tube is movable between the at least one stops and a second stop to fill the cylinder with a controlled amount of dry granular material and dispense the controlled amount of dry granular material.

3. The dispensing device according to claim 1 wherein the valve comprises a compliant flexible valve with fingers that open under pressure and will not damage fragile dry granular material.

4. The dispensing device according to claim 1 wherein the valve comprises a ball spring valve with the ball configured to compress the spring under pressure generated by the dry granular material within the filled cylinder pressed by the piston ring and inner tube to open the valve.

5. The dispensing device according to claim 1 further comprising an optional clip for the inner tube to further restrict movement of the inner tube to allow dispensing a smaller controlled amount of material.

6. The dispensing device according to claim 1 wherein the removable reservoir comprises a handle allowing operation while being hand-held.

7. The dispensing device according to claim 1 further comprising an optional clip for the inner tube to further restrict movement of the inner tube.

8. The dispensing device according to claim 1 wherein the at least one stops comprises a cap that secures the removable material reservoir to the inner tube against which the outer tube abuts and a stop ring secured to the inner tube between a lower end of the out tube and the piston ring within the cylinder.

9. The dispensing device according to claim 1 wherein the inner tube and the piston ring are configured such that as the end of the inner tube is slid downward within the cylinder, the end of the inner tube and the piston ring pushes against the material within the cylinder to create a pressure to open the valve.

* * * * *